United States Patent [19]

Hunger et al.

[11] B 4,005,068
[45] Jan. 25, 1977

[54] DISAZO COMPOUNDS FROM DIPHENYLENE SULFONES AND ACETOACETYLBENZIMIDAZOLONES

[75] Inventors: Klaus Hunger, Kelkheim, Taunus; Bernhard Mees, Konigstein, Taunus, both of Germany

[73] Assignee: Hoechst Aktiengesellschaft, Frankfurt am Main, Germany

[22] Filed: June 4, 1974

[21] Appl. No.: 476,267

[44] Published under the second Trial Voluntary Protest Program on April 6, 1976 as document No. B 476,267.

[30] Foreign Application Priority Data

June 6, 1973 Germany .......................... 2328678

[52] U.S. Cl. ........................... 260/157; 260/309.2; 260/332.1

[51] Int. Cl.$^2$ .................... C09B 35/34; D06P 3/00; D06P 3/24; D06P 3/52

[58] Field of Search .................. 260/157, 176, 152

[56] References Cited

UNITED STATES PATENTS 2,879,266 3/1959 Anderson ........................... 260/152

FOREIGN PATENTS OR APPLICATIONS 1,213,995 11/1970 United Kingdom ............... 260/152

*Primary Examiner*—Floyd D. Higel
*Assistant Examiner*—John J. Doll
*Attorney, Agent, or Firm*—Curtis, Morris & Safford

[57] ABSTRACT

Novel valuable, water-insoluble disazo pigments of the general formula 1

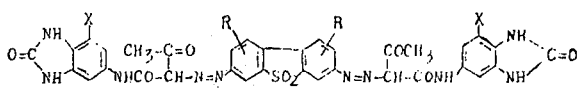

wherein R is hydrogen, methyl, methoxy or halogen, preferably chlorine or bromine, and X also represents hydrogen or halogen, preferably chlorine. The disazo compounds are obtained by bisdiazotizing a 2,7-diaminodiphenylenesulfone and coupling it on an acetoacetylbenzimidazolone. These pigments are suitable for preparing printing inks, color lakes and dispersion paints, for dyeing rubber, plastics and natural or synthetic resins. Furthermore, they are suitable for the printing of pigments on substrates, especially textile fibre materials or other flat articles such as paper.

The pigments may be used for other purposes, for example in a finely divided form for dyeing rayon of viscose or cellulose ethers or esters, polyamides, polyurethanes, polyglycolterephthalate or polyacrylonitriles in the spinning mass or for dyeing paper. The pigments may be processed well in the mentioned media. The dyeings have a good color intensity as well as good fastnesses to light and to migration and are resistant to the influence of heat and chemical products, above all solvents.

3 Claims, No Drawings

DISAZO COMPOUNDS FROM DIPHENYLENE SULFONES AND ACETOACETYLBENZIMIDAZOLONES

The present invention relates to novel valuable, water-insoluble disazo pigments of the general formula 1

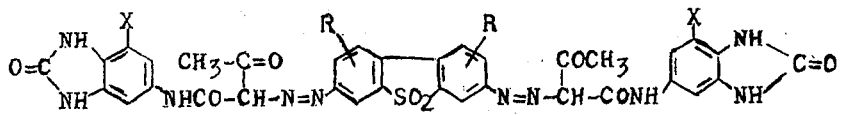 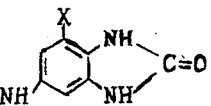

wherein R is hydrogen, methyl, methoxy or halogen, preferably chlorine or bromine, and X also represents hydrogen or halogen, preferably chlorine, as well as a process for their preparation, in which diazonium compounds of 2,7-diamino-diphenylene-sulfones of the general formula 2

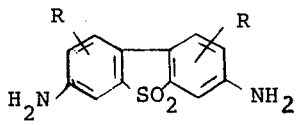

are coupled with 5-acetoacetylamino-benzimidazolones of the general formula

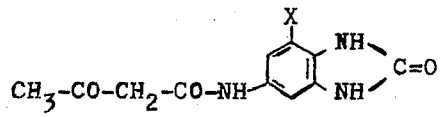

wherein R and X are as defined above.

Preferred compounds are such diazo pigments of the formula 1, wherein the substituents R are in a 3- and 6-position in the diphenylene-sulfone ring.

The diazo components may be prepared according to known methods by treating for example the corresponding diaminodiphenyl compounds with oleum at an elevated temperature. The diphenylene-sulfones thus obtained can be used directly as diazo coponents.

The pigments of the general formula 1 can be prepared according to known methods, for example by combining the diazonium compounds with the coupling components in an aqueous medium. In order to obtain, if possible, a quantitative diazotation of the amines, it is recommended to diazotize first with nitrosylsulfuric acid and then to dilute with water. It may be useful to use surface-active agents, such as for example non-ionic, anion-active or cation-active dispersing agents.

Diazotazion and coupling may also be carried out in the presence of suitable organic solvents, such as glacial acetic acid, alcohol, dioxane, formamide, dimethylformamide, dimethylsulfoxide, pyridine or N-methylpyrrolidone.

To obtain the full color intensity and a particularly favorable crystal structure, it is suitable to heat the coupling mixture for some time, for example to boiling or to maintain it under pressure at temperatures above 100°C, if desired, in the presence of an organic solvent such as ethanol, o-dichloro-benzene, dimethylformamide or in the presence of resin soap. Particularly pure and intense pigments are obtained with the products of the invention, if, after coupling, the moist press cakes or the dried powders are subjected to a thermal after-treatment with organic solvents such as alcohols, pyridine, glacial acetic acid, dimethylformamide, N-methyl-pyrrolidone, dimethylsulfoxide, dichloro-benzene or nitrobenzene or by grinding subsequently the pigments with addition of grinding auxiliaries.

The pigments can also be prepared in the presence of a carrier material, for example of barite. The novel pigments are insoluble in water and are suitable for preparing printing inks, color lakes and dispersion paints, for dyeing rubber, plastics and natural or synthetic resins. Furthermore, they are suitable for the printing of pigments on substrates, especially textile fibre materials, or other plain articles such as paper.

The pigments may be used for other purposes, for example in a finely divided form for dyeing rayon of viscose or cellulose ethers or esters, polyamides, polyurethanes, polyglycolterephthalate or polyacrylonitriles in the spinning mass or for dyeing paper.

The pigments may be processed easily in the mentioned media. The dyeings have a good color intensity as well as good fastnesses to light and to migration and are resistant to the influence of heat and chemical products, above all solvents.

From the U.S. Pat. Nos. 2,879,266 and 3,574,181 disazo dyestuffs are known which contain substituted 2,7-diaminodiphenylene-sulfones as diazo component and which are distinguished from the pigments of the present invention by other coupling components. As compared with the dyestuffs known from the U.S. Patent Specifications mentioned the pigments according to the invention are characterized by a better fastness to migration and to over-varnishing.

From Belgian Pat. No. 723,012 and U.S. Pat. No. 3,555,002 monoazo dyestuffs are known, which also contain 5-acetoacetylamino-benzimidazolone as a coupling component and which differ from the pigments of the present invention by other diazo components. In contradistinction to the monoazo dyestuffs of these Patent Specifications the disazo pigments of the present invention are distinguished by a considerably higher color intensity.

The following Examples illustrate the invention. Parts and percentages are by weight unless stated otherwise.

EXAMPLE 1

24,5 parts of 2,7-diamino-diphenylene-sulfone were introduced at room temperature into 200 parts by volume of sulfuric acid monohydrate. After cooling to 0°C, the mixture was diazotized with 150 parts by volume of nitrosylsulfuric acid. Stirring was continued for two hours and then the reaction mixture was poured onto 1500 parts by volume of ice. The excess of nitrite was removed with a small amount of amidosulfonic acid.

This diazo solution was poured at about 20°C, while stirring well, to an acetic acid suspension of the coupling component which was prepared in the following manner:

49 Parts of 5-acetoacetylaminobenzimidazolone were stirred at room temperature in 1000 parts by volume of water and dissolved with 54 parts by volume of a 33% sodium hydroxide solution. 10 Parts by volume of a 10% solution of a reaction product of about 30 mols of ethylene oxide and one mol of oleyl alcohol were added to this solution, and the solution was precipitated by pouring rapidly 40 parts by volume of glacial acetic acid.

When the addition of the diazo solution was finished, coupling was completed soon. The coupling mixture was heated to 90°C, suction-filtered, thoroughly washed with water and dried at 70°C. The pigment thus obtained was maintained in 600 parts by volume of dimethyl sulfoxide for 2 hours at 130°C. Then it was suction-filtered, the dimethylsulfoxide was thoroughly washed out with water and the pigment was dried. A soft pigment having a soft grain and a pure shade was obtained. Incorporated into a printing ink, a lacquer, a dispersion paint or into polyvinyl chloride, the pigment yielded yellow dyeings having an excellent color intensity, a very good fastness to overvarnishing, a good fastness to light and an excellent fastness to bleeding.

EXAMPLE 2

24.5 Parts of 2,7-diamino-diphenylene-sulfone were introduced at room temperature into 200 parts by volume of sulfuric acid monohydrate. After cooling to 0°C, the mixture was diazotized with 150 parts by volume of nitrosylsulfuric acid. Stirring was continued for 2 hours and the mixture was poured onto 1500 parts of ice. Any excess of nitrite present was removed with amidosulfonic acid. This diazo solution was poured at about 20°C, while stirring well, to into an acetic acid suspension of the coupling component, which was prepared in the following way:

56.2 Parts of 5-acetoacetylamino-7-chlorobenzimidazolone were stirred at room temperature in 1000 parts by volume of water and dissolved with 54 parts by volume of a 33% sodium hydroxide solution. A small amount of charcoal was added to this solution, it was clarified and the solution was adjusted to pH 5 by addition of 40 parts by volume of glacial acetic acid, the coupling component being precipitated and suspended.

When coupling was finished the solution was heated to 90°C and suction-filtered. After washing thoroughly the dyestuff was dried at 80°C. After drying the pigment was maintained in 650 parts by volume of N-methylpyrrolidone for 6 hours at 155° – 160°C. Then it was suction-filtered, washed thoroughly and dried again. The color-intense pigment thus obtained provided yellow dyeings with the same very good fastness properties as the pigment described in Example 1; the shade was somewhat more greenish.

EXAMPLE 3

27.4 Parts of 3,6-dimethyl-2,7-diaminodiphenylene-sulfone were dissolved in 200 parts by volume of sulfuric acid monohydrate at a maximum temperature of 40°C. The mixture was cooled to 0°C and diazotized with 150 parts by volume of nitrosylsulfuric acid. Stirring was continued for one hour and then the batch was poured onto ice according to Example 1 and freed from the excess of nitrite.

The diazo solution thus obtained was poured at about 20°C while stirring well, into a solution of the coupling component, which was prepared in the following manner:

56.2 Parts of 5-acetoacetylamino-7-chlorobenzimidazolone were dissolved at room temperature in 500 parts by volume of dimethylformamide. 750 Parts by volume of a 4N sodium acetate solution were added to the solution.

To complete the coupling about 200 parts by volume of pyridine were added finally. Then the mixture was heated to 80° – 90°C and suction-filtered. The dyestuff was further worked up as indicated in Example 1. When mixing and triturating 0.8 part of the pigment obtained according to the above prescription, 2.4 parts of hydrate of alumina and 4.8 parts of a printer's varnish, a printer's ink was obtained which had a pigment content of about 10 percent by weight, which provided yellow prints having a high purity and color intensity and a good fastness to light.

EXAMPLE 4

200 Parts by volume of N-methyl-pyrrolidone were introduced into a flask and cooled to −10°C. At this temperature 150 parts by volume of nitrosylsulfuric acid were slowly added dropwise, and stirring was continued for 15 minutes. At −10°C, 30.6 parts of 3.6-dimethoxy-2,7-diamino-diphenylene-sulfone dissolved in 200 parts by volume of N-methylpyrrolidone were added dropwise, and stirring was continued for 1 hour. By addition of solid amidosulfonic acid any excess of nitrite present was removed.

At −5°C a solution of 49 parts of 5-acetoacetylamino-benzimidazolone in 500 parts by volume of N-methylpyrrolidone was added dropwise to the diazo solution, and 200 parts by volume of water and a total of 150 parts by volume of pyridine was added portionwise during coupling. Stirring was continued for one hour and the whole coupling mixture was heated to 130°C, and the temperature was maintained for 4 – 5 hours.

Then the whole was suction-filtered, thoroughly washed with water and dried at 80°C in the vacuum drier. When mixing on a roller mill 67 parts of polyvinyl chloride, 33 parts of a plasticizer mixture of equal parts of dioctyl phthalate and dibutyl phthalate, 2 parts of dibutyl tin dilaureate, 0.5 part of titanium oxide and 0.1 part of the pigment obtained according to the above Example, for 15 minutes at 160°C, and when processing these substances to a foil, the yellow red dyeing thereof was characterizied by a very good color intensity, an excellent fastness to migration and a good fastness to light.

EXAMPLE 5

18 Parts by volume of nitrosyl-sulfuric acid were slowly added dropwise to a solution of 100 parts by volume of N-methylpyrrolidone cooled to −5°C. Stirring was continued for 15 minutes. A clarified solution of 12.3 parts of 2.7-diaminodiphenylene-sulfone in 200 parts by volume of N-methylpyrrolidone was added dropwise to the above nitrating solution, while the temperature was maintained between −5°C and 0°C. Stirring was continued for one hour with an excess of nitrite, and at 0°C a solution of 24 parts of 5-acetoacetylamino-benzimidazolone in 400 parts by volume of dimethylformamide was added dropwise to the diazonium solution prepared above. 40 Parts by volume of triethanol amine were added dropwise. Without cooling, stirring was continued for one hour. When it was sure that the coupling of the batch was finished the whole mixture was heated for 3 hours to 160° – 170°C. It was cooled to 50°C, suction-filtered, rinsed with N-methylpyrrolidone and water and dried at 60° – 70°C. A reddish yellow pigment having the same constitution and properties as described in Example 1 was obtained.

EXAMPLE 6

18 Parts by volume of nitrosylsulfuric acid were introduced dropwise while stirring into 100 parts by volume of dimethylformamide cooled to −5°C and stirring was continued for 15 minutes. At −5°C to 0°C a solution of 13.7 parts of 3,6-dimethyl-2,7-diaminodiphenylene-sulfone in 200 parts by volume of dimethylformamide was added dropwise while stirring to this solution. Stirring was continued for 30 minutes at −5°C to 0°C.

A solution of 24 parts of 5-acetoacetylamino-benzimidazolone in 400 parts by volume of dimethylformamide was prepared by heating to 40° − 50°C.

The whole was cooled to 20°C and this solution was slowly added dropwise while stirring to the diazonium solution maintained at 0°C. 40 Parts by volume of pyridine was added, and stirring was continued for one hour without cooling. Coupling of the reaction mixture was already finished immediately after the addition of pyridine. The mixture was heated to 160°C in a closed vessel and maintained at this temperature for 4 hours.

The following Table contains a number of further Examples of diazo pigments which are obtained in an analogous way, as well as their shades.

Table 1

| Ex. | Diamine | Coupling component | shade |
|---|---|---|---|
| 5 | 3,6-Dichloro-2,7-diamino-diphenylene-sulfone | 5-Acetoacetylamino-benzimidazolone | greenish yellow |
| 6 | 3,6-Dichloro-2,7-diamino-diphenylene-sulfone | 5-Acetoacetylamino-7-chlorobenzimidazolone | greenish yellow |
| 7 | 3,6-Dimethyl-2,7-diamino-diphenylene-sulfone | 5-Acetoacetylamino-benzimidazolone | yellow |
| 8 | 3,6-Dimethoxy-2,7-diamino-diphenylene-sulfone | 5-Acetoacetylamino-7-chlorobenzimidazolone | yellow |

We claim:
1. A disazo pigment of the formula

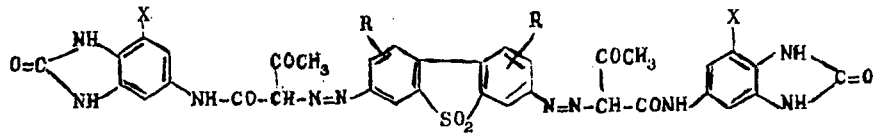

wherein R is hydrogen, methyl, methoxy, chlorine or bromine and X is hydrogen or chlorine.

2. A disazo pigment of claim 1 which has the formula

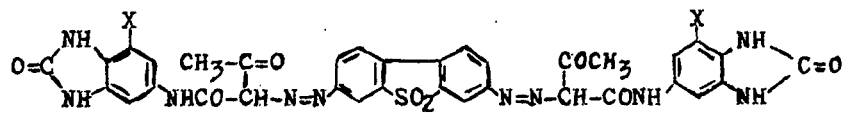

wherein R and X are as defined in claim 1.

3. The disazo pigment of claim 1 of the formula

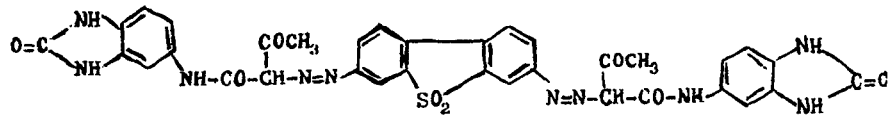

* * * * *